United States Patent
Burge, III

(10) Patent No.: US 8,751,743 B2
(45) Date of Patent: Jun. 10, 2014

(54) APPARATUS AND METHOD FOR CONTEXT-AWARE MOBILE DATA MANAGEMENT

(75) Inventor: Legand L. Burge, III, Washington, DC (US)

(73) Assignee: Howard University, Washington, DC (US)

( * ) Notice: Subject to any disclaimer, the term of this patent is extended or adjusted under 35 U.S.C. 154(b) by 547 days.

(21) Appl. No.: 13/047,992

(22) Filed: Mar. 15, 2011

(65) Prior Publication Data

US 2011/0225368 A1 Sep. 15, 2011

Related U.S. Application Data

(60) Provisional application No. 61/340,294, filed on Mar. 15, 2010.

(51) Int. Cl.
*G06F 12/08* (2006.01)
*G06Q 30/00* (2012.01)
*G06F 17/30* (2006.01)
*H04M 3/42* (2006.01)

(52) U.S. Cl.
USPC ....... 711/118; 711/135; 705/7.34; 705/14.49; 705/14.58; 705/14.66; 455/414.1; 455/414.3; 455/456.2

(58) Field of Classification Search
None
See application file for complete search history.

(56) References Cited

U.S. PATENT DOCUMENTS

| | | | |
|---|---|---|---|
| 2003/0187988 A1 | 10/2003 | Lee et al. | |
| 2005/0043060 A1* | 2/2005 | Brandenberg et al. | 455/558 |
| 2006/0253453 A1* | 11/2006 | Chmaytelli et al. | 707/10 |
| 2007/0192300 A1 | 8/2007 | Reuther et al. | |
| 2008/0098420 A1* | 4/2008 | Khivesara et al. | 725/32 |
| 2008/0109285 A1 | 5/2008 | Reuther et al. | |
| 2008/0133336 A1* | 6/2008 | Altman et al. | 705/10 |
| 2008/0200207 A1* | 8/2008 | Donahue et al. | 455/556.2 |
| 2009/0216847 A1* | 8/2009 | Krishnaswamy et al. | 709/206 |
| 2009/0281722 A1* | 11/2009 | Bitonti et al. | 701/207 |
| 2009/0287750 A1* | 11/2009 | Banavar et al. | 707/204 |
| 2009/0319177 A1* | 12/2009 | Khosravy et al. | 701/207 |
| 2010/0035589 A1* | 2/2010 | Wormald et al. | 455/414.1 |
| 2011/0113471 A1* | 5/2011 | Hjelm et al. | 726/1 |
| 2011/0125571 A1* | 5/2011 | Jagadish | 705/14.43 |
| 2011/0213655 A1* | 9/2011 | Henkin et al. | 705/14.49 |

OTHER PUBLICATIONS

International Search Report dated Oct. 27, 2011 relating to PCT/US2011/028511.
International Preliminary Report on Patentability dated Sep. 27, 2012 (PCT/US2011/028511) 5 pages.

* cited by examiner

*Primary Examiner* — Kaushikkumar Patel
(74) *Attorney, Agent, or Firm* — Fitch, Even, Tabin & Flannery LLP

(57) ABSTRACT

A context of a mobile device is determined. A context preference of a user associated with the mobile device is determined. The context of the mobile device and the user context preference is transmitted to another node and responsively returned data is received. Available free space in the mobile device is determined. All data whose timestamp is within a predetermined threshold is cached. The data is cached in at least a portion of the free space.

15 Claims, 14 Drawing Sheets

902 <MobileContextMsg> := <ContextVector> <LastAccessTime> <Preference Vector>
904 <Response> := <Replica> | <Response><Replica> |
    <SharedUpdate>| <Response><SharedUpdate>|
    <PrivateUpdate>| <Response><PrivateUpdate>
<PrivateUpdate> := <UserID><Content> <MetaData> <CurentTime>
<SharedUpdate> := <Content> <MetaData> <CurrentTime>
<UserID> : = GUID
<Replica> := <Content> <MetaData> <CurrentAccessTime>
<Content> := <Data> <Content> | <Data>
<Data> := <Text> | <Document> | <Video> | <Audio> | <HTML> | <URL>
<MetaData> := <Location><Time><DemoGraphics><UserActivity>
<CurrentAccessTime> : = <Time>
<ContextVector> := <Location> <Time> <Demographics> <UserActivity>
<Location> := <Logitude> <Latitude>
<Time> := <HH>:<MM>:<SS>
<Demographics> := <KeyValuePair>
<LastAccessTime> : = <Time>
<UserActivity> := <KeyValuePair>
<Preference Vector> := <Demo$_{Weight}$> <Location$_{Weight}$> <Radius> <Time$_{Weight}$> <UserActivity$_{Weight}$>
<DemoWeight> := [0...1]
<Location Weight> := [0...1]
<LocationRadius> := [0...1]
<TimeWeight> := [0...1]
<UserActivityWeight> := [0...1]
<KeyValuePair> := <Key>=<Value> <KeyValuePair> | <Key>=<Value>
<HH> : = 1|2...9|10|11|12....|23|24
<MM> := 1|2...9|10|11|12
<SS> := 00|01|02.....57|58|59

*FIG. 9A*

<Key> : = 'Gender' | 'Age' | 'Income' | 'Occupation' | 'Marital Status' | 'UserKeyword'

<Value> := 'Male' | 'Female'

<Value> := '13 - 17'|'18 - 29'|'30 - 49'| '50 - 64'| '65+'

<Value> := '$19K - $40K'| '$41 - $75K'| '$76K - $100K'|
    '$10lK - $150K'| '$151K - $200K'| $201K+

<Value> := <Keywords Obtained From The Application>

APPARATUS AND METHOD FOR CONTEXT-AWARE MOBILE DATA MANAGEMENT

CROSS REFERENCES TO RELATED APPLICATION

This patent claims benefit under 35 U.S.C. §119(e) to U.S. Provisional Application No. 61/340,294 entitled "Apparatus and Method for Context Aware Applications" filed Mar. 15, 2010, the content of which is incorporated herein by reference in its entirety.

FIELD OF THE INVENTION

This application relates to mobile computing applications, and more specifically to caching and replication of data within mobile context-aware computing applications.

BACKGROUND OF THE INVENTION

Pervasive mobile computing has become increasingly popular with the appearance and penetration of mobile devices such as portable notebook computers, tablet personal computers (PCs), internet tablets, personal digital assistants, ultra mobile PCs, smart phones, and carputers. Pervasive mobile computing supports the accessibility of data and services at any time, from anywhere, and in any form. As wireless wide area networks (WWAN), wireless local area networks (WLAN), and short range wireless technology (e.g., Bluetooth) converge to support data and voice, cross layer network design will enable peer-to-peer (P2P) communications between mobile devices, further increasing the pervasiveness of mobile applications. Specific types of pervasive mobile applications include context-aware mobile applications. In context-aware mobile applications, it is desirable that programs and services react specifically to their current location, time and other environment attributes and adapt their behavior to changing circumstances as context data change.

The needed context information may be retrieved in a variety of ways such as applying sensors, device information, user demographics, device/user interactions, network information, device status, browsing user profiles, and using other sources. For example, during device operation the physical operating environment or the physical location of the device may change causing the data and/or services to change. Data and services may change due to the time of day, or based on how the user interacts with the device and the mobile application. In another example, the occurrence of an event may impact the operation of the device. For instance, power outages, increases in Internet traffic, or changes in environmental conditions (e.g., the weather when the device is being operated outdoors) may occur.

All data (e.g., text, images, audio, video, and html) maintained within a context-aware mobile application are associated with contextual metadata. Contextual metadata may include time, date, location, keywords, demographics, to mention a few examples.

In the above-mentioned environments, mobile computing applications suffer from various challenges including intermittent connectivity and the lack of device resources. Intermittent connectivity refers to the requirement that the mobile application must often continue to operate despite the short or long periods of network unavailability. The lack of device resources is due in part to the small sizes of the mobile devices, thereby restricting the available device storage, computational capacity, and power. Previous systems have proved inadequate in addressing these problems.

BRIEF DESCRIPTION OF DRAWINGS

FIGS. 9A and 9B illustrates a formal grammar describing messages sent between a mobile device and a remote server, and messages sent between two peer mobile devices in accordance with various embodiments of the invention;

Figure 1A:
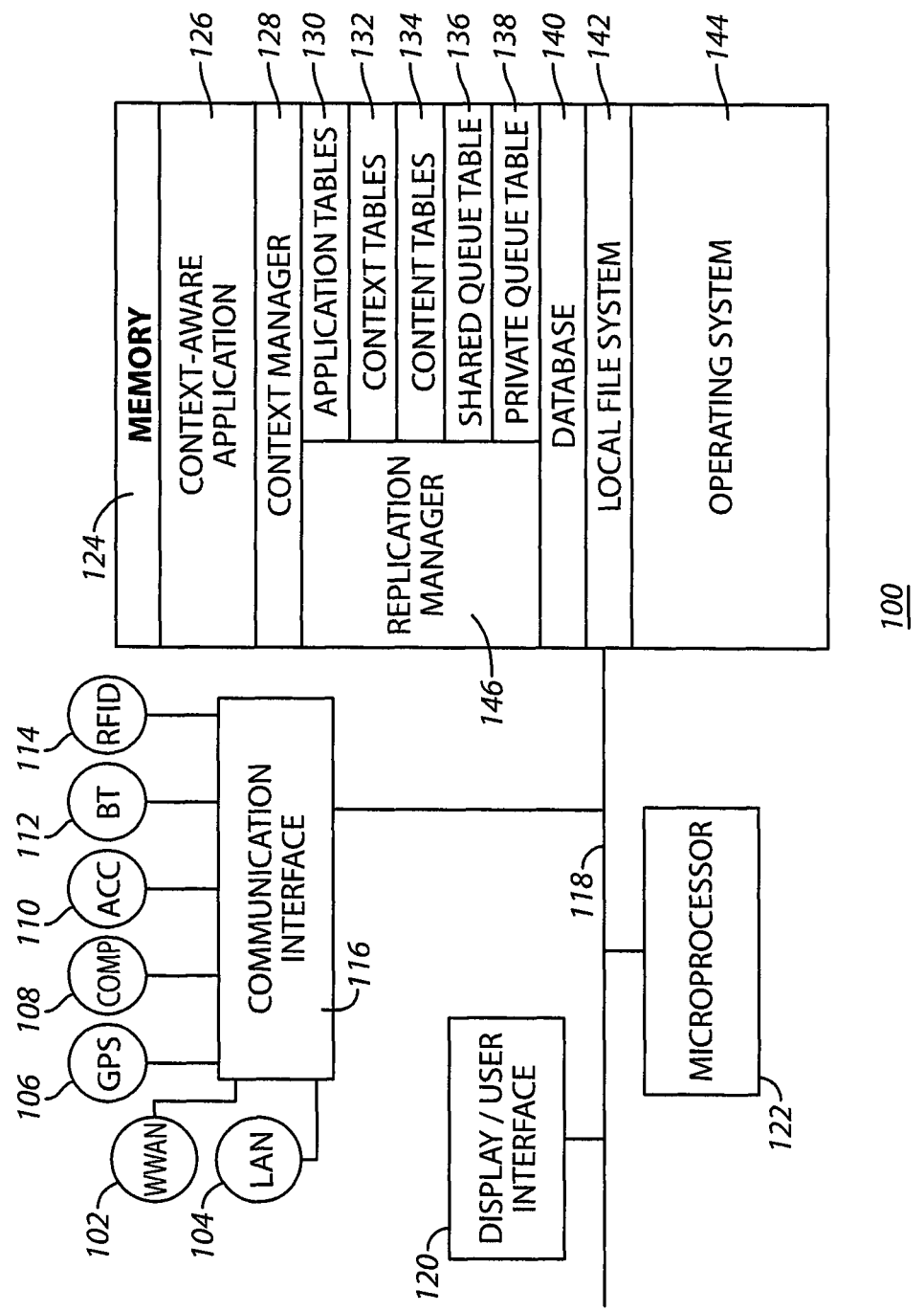
FIG. 1A comprises a block diagram a mobile device in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their correspond-

DETAILED DESCRIPTION OF THE PREFERRED EMBODIMENTS

In the approaches described herein, the additional contextual metadata available to mobile context aware systems in today's operating environment may be leveraged to provide smarter and more efficient caching algorithms. Also, this additional contextual metadata available to mobile context aware systems may be leveraged to provide more power efficient caching algorithms using weak consistent P2P replication. Weak consistency does not force all nodes (e.g., mobile devices or remote servers) to have the same data at all times, and see all updates instantaneously, but allows nodes to be different, and diverge to consistency over time. This is extremely advantageous in applications that do not have many updates (e.g., mobile content distribution systems such as spot guides, news applications, tracking applications, mobile advertising, and mobile blogs).

Approaches for efficiently caching and replicating application data from a remote server to a mobile device (or between peer mobile devices) include sensing the context of the mobile device, determining available free space in the mobile device, transmitting the mobile context information to a remote server periodically (or exchanging mobile context information with a peer mobile device when in communication range). Upon receipt of mobile context information, each receiver calculates a relevance score for all local data maintained, and returns all data to the sender whose relevance score is greater than some threshold to the initiator. The sender receives the returned data and all data returned whose timestamp is within a working set threshold is cached, for example, in portions of the free space. The communication session with the remote server or peer mobile device is then closed by the sender.

As used herein, a context-aware mobile application includes four components: the source, the Context-aware Application, the Context Manager, and the Replication Manager. Context sources produce contextual information of the following types: Sensed data which is produced by sensors; user defined (profiled) data which is entered into the context-aware application by the user; and user activity data which is gathered by probing the state of the context-aware application and relaying this information to the Context Manager. To give an example of user activity data, as a user selects items in a menu within the context-aware application, the application may infer relevant data to display (e.g., text, audio, and video) while navigating through each menu item. One role of the context manager is to store, retrieve and evaluate context information and to make it available to applications via synchronous and asynchronous interfaces. The Replication Manager is responsible for distributing the application data and metadata across the system of mobile devices and the remote server, and maintaining a level of consistency between them.

As used herein, the term "context" refers to the environment in which a mobile application operates, the user state, or the internal state of the mobile application. The context may include or be associated with various parameters such as the geographic location or geographic coordinates of the device, other environmental conditions in which the device is operating (e.g., angle, pitch/yaw, heading, and temperature), or a particular cellular location of the device (e.g., cell number or other identifier). The context may also include the exact time (e.g., 12:59 pm) or general time of day (e.g., morning, afternoon, or evening). The context may further include or be associated with the occurrence (or non-occurrence) of certain events such as a power failure, entry of user data, user state (e.g. demographics), and application specific state information. Other examples of "context" are possible.

As used herein, "caching" refers to transparently storing relevant data on the local mobile device so that future requests for that data can be served faster and more efficient, thereby eliminating the need to access data over costly communication links. Data is relevant if its metadata is similar to the current context, and it has been recently used. For example, once a mobile application initially references data from a remote server based on its local context, if in the near future the device returns to this context, then each subsequent data access will be made locally.

As used herein, "replication" refers to maintaining data at two or more different physical locations within the overall distributed system. Replication within a distributed system can maintain strong or weak consistency between replicas. In strong consistency replication, all physical locations are equivalent, and all locations see updates instantaneously. Strong consistency is very inefficient and typically does not work in highly mobile intermittently connected distributed systems. In weak consistency replication, all physical locations may contain different replicas. Weak consistency is very effective for distributed systems that are highly mobile and contain intermittent communication. Since replicas eventual diverge and become consistent over time, weak consistency works best for applications that do not require a large number updates, or instantaneous updates across replicas.

In some aspects, context sensing is event based, and is performed periodically by querying the local clock, global positioning system, or explicit calls to the context manager through user interactions within the mobile application. Additional contextual information is obtained from user profiles (e.g., demographics).

In some other aspects, the mobile application only maintains data that is relevant based on the current context, and data that has been recently used in time. Managing and/or determining the available free space is performed/is associated with calculating a relevance score for all local data maintained, and deleting all data whose relevance score is less than some threshold and whose timestamp is not within the working set (i.e., expired).

In still other aspects, a data replication session involves an opportunistic best effort approach to data delivery. Data replication is performed between: 1) a mobile device and a remote server, or 2) between two peer mobile devices. In both scenarios, the mobile device is the sender, and the mobile device sends its mobile context information to a receiving entity (i.e. a remote server, or another peer mobile device) to initiate a replication session. During a session, individual content delivery is guaranteed, but delivery of all content targeted for replication within a given session is not guaranteed. Data not transmitted during the session will reside on the device until the next timer interval for contacting the remote server, or during the discovery of a peer mobile device.

Data replication between a mobile device and a remote server is performed periodically based on a timed interval. This interval is set by the mobile application developer. In some aspects, data replication involving a remote server consists of a session with the following operations: 1) receiving of the mobile context; 2) identifying relevant data to replicate; 3) transmitting the selected data; 4) receiving any shared data updates; and 5) caching the most relevant data. Data selected for transmission includes both content and corresponding contextual metadata, and local updates of private and shared data. Private data updates include context and content (e.g., the modification of things like account and billing information, location information, or the sending of messages). Shared data updates include context and content (e.g. the modification of things open to the public like: current status, location, profile and so forth).

Data replication between two peer mobile devices only occurs when two devices come into communication range, and it involves a session in both directions. In some aspects, data replication involving a peer mobile device consists of a session with the following operations: 1) receiving of the mobile context; 2) identifying relevant data to replicate; 3) transmitting the selected data; and 4) caching the most relevant data. Data selected for transmission include both content and local updates of shared data, and corresponding metadata.

In many of these embodiments, data relating to or associated with the context of a mobile device is stored in the memory of a mobile device. In addition, mobile application data is also stored in the memory of the mobile device. Mobile application data is related to contextual metadata, but not related to the current context of the mobile device. For example, the mobile context may be the current time and location, and current user interests (e.g., a movie, a title, and the cost). The mobile application data that may be relevant to the current mobile context would be all the information and/or services related to the movie (e.g., a movie trailer, other information, directions to the theatre, and ticket purchasing services).

At least some of the mobile application data stored in the memory may be selectively displayed to the user. Alternatively or in addition to this information, other types of information related to the context of the operation of the mobile device may be displayed (e.g., advertisements related to the retail store that a user is passing).

The context of the device and/or the triggering event may be performed by various sensors. For example, temperature sensors may be used to determine the operating temperature of the mobile device. In another example, sensors (e.g., an antenna) may be used to sense Global Positioning Satellite (GPS) signals that can be used to determine or that indicate the location of the mobile device. Other low power wireless sensors such as Bluetooth and RFID can be used to discover other peer devices and services in the current location. In other examples, an element of the mobile device itself may indicate a triggering event. For example, a clock embedded in the mobile device may indicate the time of day.

In other aspects, the replication of data includes downloading data that overwrites only a portion of memory storing the mobile application data that is most relevant and most recently used in time.

In yet other aspects, the memory is periodically accessed according to the context of operation of the mobile device, this content is obtained from the memory, and the content is displayed to a user at the mobile device.

In some examples, the displaying of the mobile application data is accomplished as a result of a user interaction with the mobile device. In other examples, the displaying is accomplished automatically without a user interaction.

Mobile application data may include a variety of different types of information. For example, the information may consist of an advertisement or an email. Other examples of information may also be used.

In others of these embodiments, a mobile device includes one or more communication interfaces, one or more sensors, a memory, and a display. Communication is performed using a wireless wide area network (WWAN) interface, a wireless local area networks (WLAN) interface, and two low power short range wireless interfaces (i.e. Bluetooth and RFID). Peer mobile device sensing is detected based on an application layer Bluetooth Service Discovery Protocol. The mobile device memory contains the mobile context manager, stores the current mobile context, and stores mobile application data and its associated contextual metadata. The Context Manager is the intermediary between the device sensors and the mobile application.

Operation of the mobile device may also be changed depending upon its context of operation. For example, if another peer mobile device is in range, a trigger to engage into P2P replication may begin. In another example, if a RFID or Bluetooth tag is in range, a trigger to find the true physical location may begin.

The mobile device may be a variety of different types of devices. For example, the mobile device may be a portable notebook computers, tablet PCs, internet tablets, personal digital assistants, ultra mobile PCs, smart phones, and carputers. Other examples of mobile devices are possible.

Figure 2:
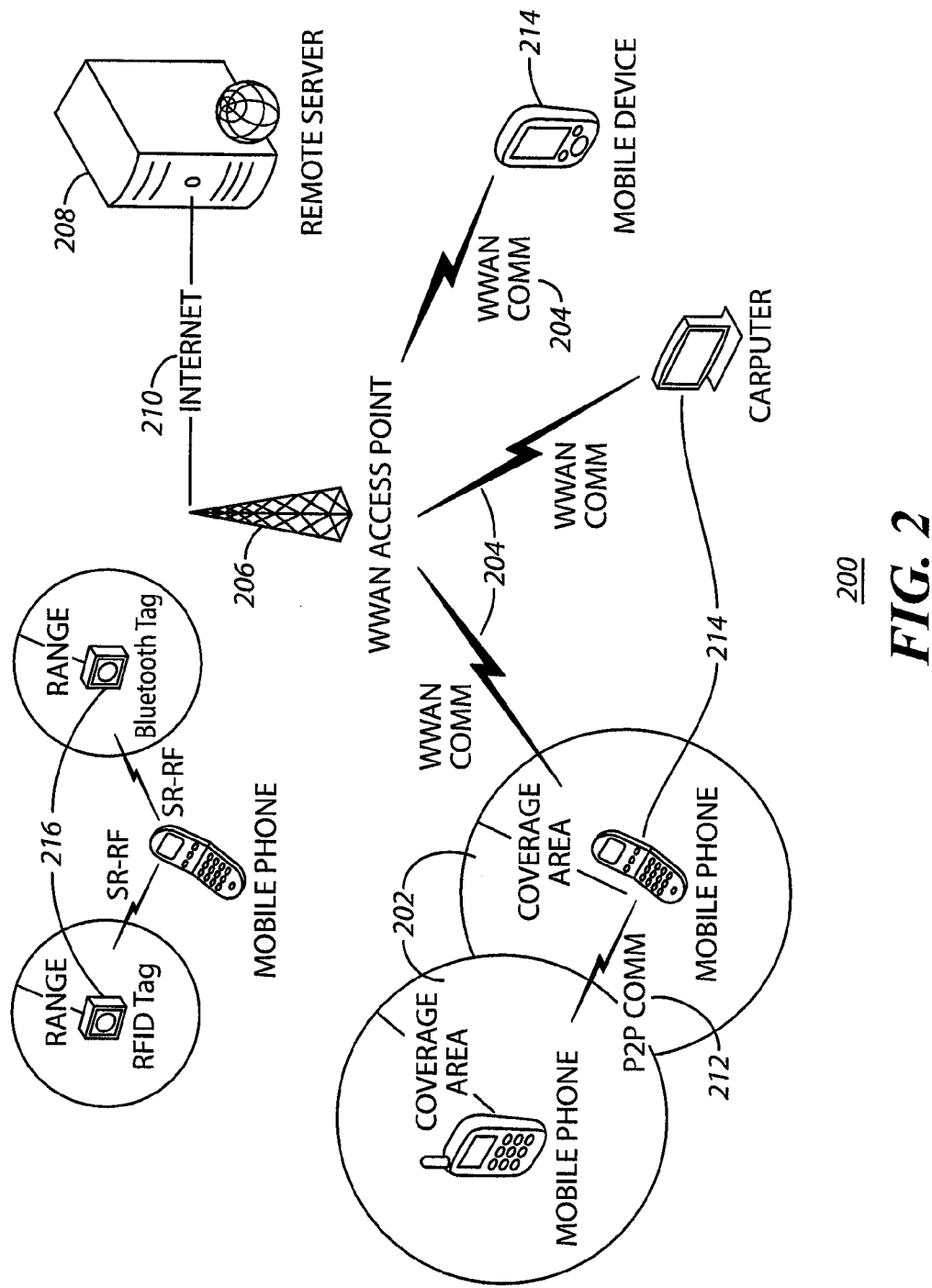
FIG. 2 comprises a diagram of a mobile wireless network and the various components that comprise a mobile context-aware system in accordance with various embodiments of the invention.

FIG. 2 schematically illustrates one example of a mobile context-aware system. A system 200 includes one or more mobile devices 214, a base station 206, and a remote server 208. The mobile devices 214 may be any mobile wireless device such as a portable notebook computer, tablet PC, internet tablet, personal digital assistant, ultra mobile PC, smart phone, and carputer. Each mobile device 214 can communicate over a wireless wide area network (WWAN) 204. As mobile devices 214 moves along random pathways (e.g., the device could be a carputer and move with the vehicle, or a mobile phone and move based on human moving patterns), it will be appreciated that mobile devices may move between different spatial and geographic areas (e.g., a downtown area or a suburban area, or from one room to another room). While in transit, a mobile device 214 may come within communication range with another mobile device 202, or active tab (e.g. RFID, or Bluetooth 216). Mobile devices within communication range may transmit data via a low power wireless peer-to-peer (P2P) link 212. The base station 206 may be coupled to a remote server 208, via an internet connection 210. The remote server 208 provides the user and content management, and storage for a content distribution network on which the context-aware mobile application is derived. For example, if the server is a travel spot guide, it may store user account information, travel information, and host related services. It is assumed that during initial use, a mobile device 214 will perform a full synch with the remote server 208.

A mobile device 214 is schematically illustrated in FIG. 1A. Internally, the mobile device 100 includes a communications interface 116 for communicating with various sensor devices 102-114 (e.g. Local Area Network (LAN), Wireless Wide Area Network (WWAN), Global Positioning System (GPS), Digital Compass, Accelerometer, Bluetooth, and RFID), a microprocessor 122 (or any other type of controller or processing device), a display/user interface 120, and a memory 124. In some aspects, the display/user interface 120 includes a user input device (e.g. a keyboard and touch screen) and an output device (e.g. a display screen). The memory 124 includes an operating system 144, a local file system 142, a replication manager 146, a context manager 128, the context-aware application 126, and a mobile database 140. In some aspects, the mobile database includes a set of application tables 130, a set of content tables 134, a set of context tables 132, and a set of shared and private queue tables 136 and 138 to hold outgoing replication data. It will be appreciated that some of the elements of FIG. 1A may be implemented as combinations of hardware and/or software, for instance as computer instructions stored on computer media and executed by a processing device or controller.

Figure 1B:
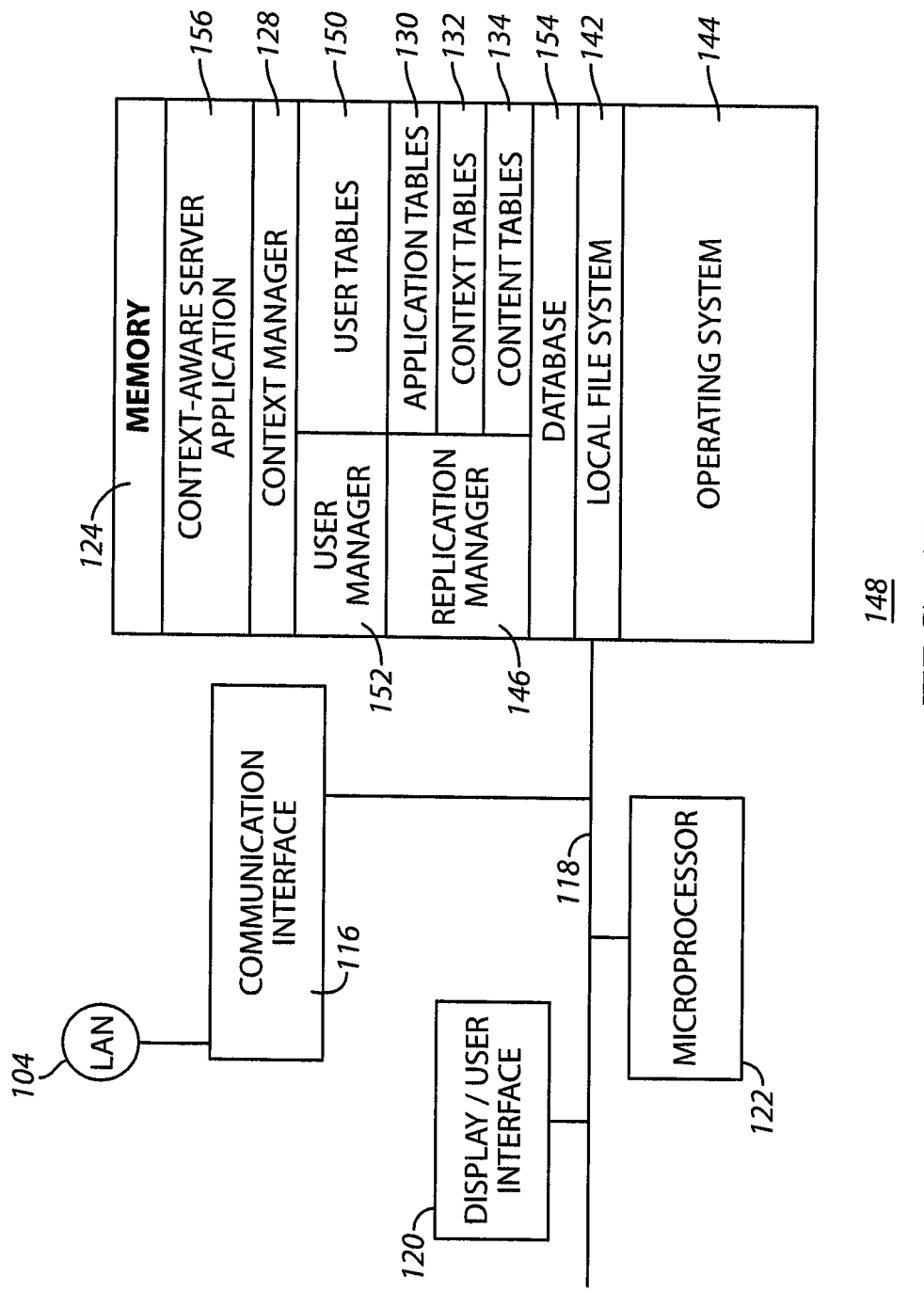
FIG. 1B comprises a block diagram of a remote server in accordance with various embodiments of the invention.

A remote server 208 is schematically illustrated in FIG. 1B. Internally, the remote server 148 includes a communications interface 116 for communicating with a high speed Local Area Network (LAN) 104, a microprocessor 122, a display/user interface 120, and a memory 124. In some aspects, the display/user interface 120 includes a user input device (e.g. a keyboard) and an output device (e.g. a display screen). The memory 124 includes an operating system 144, a local file system 142, a replication manager 146, a context manager 128, a user manager 152, the context-aware server application 156, and an enterprise database 154. In some aspects, the mobile database includes a set of user tables 150, a set of application tables 130, a set of content tables 134, and a set of context tables 132. It will be appreciated that some of the elements of FIG. 1B may be implemented as combinations of hardware and/or software, for instance as computer instructions stored on computer media and executed by a processing device or controller.

In some aspects, the context-aware application 126 provides a front end user interface to mobile content distribution systems like: spot guides, news apps, tracking applications, mobile advertising, and mobile blogs. Mobile users can login and register to a remote server 208. In addition, mobile users explicitly access content and services via a menu list, and one or more sub-list shown in the displayed/user interface 120. In addition, implicit access to content and services is achieved via asynchronous notifications such as: a dynamically generated list of advertisements, SMS text messages, emails, and a dynamically generated list of content and services. Other examples are possible. Users can customize the quality of their application experience by setting the preferences for the temporal, spatial, demographical, and user activity context for the content and services they would explicitly access and receive via asynchronous notifications. In some aspects, all content and services selected from the user interface 120 is queried and obtained from the Application Tables 130 and Content Tables 134. All content data maintained within the Content Tables 134 has associated contextual metadata stored in the Context Tables 132. In an effort to improve user quality and experience, the Context-aware Application 126 invokes the Context Manager 128 when querying for content to display to the user interface. All queries select the most relevant data based on the context of the mobile device, and the preferred quality of the user experience.

In other aspects, the context-aware server application 156 provides a web-based front end user interface on which to manage mobile user accounts, content vender accounts, and content and services that support a mobile context-aware content distribution application such as spot guides, news apps, tracking applications, mobile advertising, and mobile blogs. Other examples are possible. All users (e.g., mobile, vendor, and administrative) can login and register with the context-aware server application 156. Administrative users can create, read, update, and delete all mobile user and content vender account information stored in one of the Application Tables 130. Vendor users can create, read, update, and delete their own vendor account information and content and services they would like to publish to all mobile users. Vendor account information and their content and services are stored in one of the Application Tables 130 and Context Tables 134.

In some aspects, Vendor users can access the Context-Aware Application Server which in turn invokes the Context Manager 128 to associate contextual metadata related to their content and services they want to publish to all mobile users and stored in the Content Tables 134. There are four contexts maintained by the Context Manager 128: (1) Location, (2) UserActivity, (3) Time, and (4) Demographic. All contextual metadata is stored in the Context Tables 132, and is used to determine the likelihood of relevance of content and services for strategic targeting on both the mobile device 214, and the remote server 208.

In some aspects, to create the Time context, Vendor users publish content (e.g., text audio, video, advertisements, and documents) and services (or, in other examples, Uniform Resource Locators (URLs) to webservices) and provide a start date and time $PStart_{date/time}$ and $PStop_{date/time}$. All content and services are published as events and given an event start date $EStart_{date}$, and an event stop date $EStop_{date}$. All contextual date/time information is stored in the Context Tables 132. This is the date the actual content and service is live. The event start date may or may not be the publish start date, and $EStart_{date} \geq PStart_{date}$. The event stop date typically ends on the last publish date. Therefore, $EStop_{date} = PStop_{date}$. All content and services have a display start time $DStart_{time}$, and a display stop time $DStop_{time}$. The display start time is the actual time of day the vendor wishes to push the content and services to mobile users. In some aspects, a mobile device 214 has the ability to sense a mobile device's time ($M_{time}$) and date ($M_{date}$) using the method described elsewhere herein.

In still other aspects, time relevance can be calculated on both the mobile device 214, and remote server 208 for contextual targeting, and smart caching. Given a vendor has published content and services, and the display has started, as the current time moves toward the event time, the more relevant the content and service is to the mobile user. The likelihood of relevance the current time ($M_{time}$) and the current date ($M_{date}$) is to content/services quality is calculated using the following functions:

$$Quality_{date}(D) = \begin{cases} 1 & -\text{if } PStart_{date} \leq D < EStart_{date} \\ e^{\frac{-(EStart_{date}-D)}{((EStart_{date}-PStart_{date})/2)+1}} & -\text{if } EStart_{date} \leq D \leq EStop_{date} \\ 0 & -\text{if } D > PStop_{date} \end{cases}$$

$$Quality_{time}(T) = \begin{cases} 1 & -\text{if } DStart_{time} \leq T \leq DStop_{time} \\ 0 & -\text{otherwise} \end{cases}$$

The Time Context or time relevance is calculated as:

$$Time_{score}(M_{time}, M_{date}) = Quality_{time}(M_{time}) \times Quality_{date}(M_{date})$$

In some aspects, to create the Location context, Vendor users publish content (e.g., text audio, video, advertisements, and documents) and services (or, in other examples, Uniform Resource Locators (URLs) to webservices) and provide a location of interest stored in the Context Tables 132. The content and services location of interest $CS_{Loc}(CS_{Long}, CS_{Lat})$ is a geocoded longitude ($CS_{Long}$) and latitude ($CS_{Lat}$) tuple in decimal format. Vendors may choose to also associate a Location_ID or global unique identifier (GUID) of a RFID or Bluetooth tag that resides at the physical longitude ($CS_{Long}$) and latitude ($CS_{Lat}$). Locations of interest are assigned a default circular coverage area with a radius of $Radius_{default}$. $Radius_{default}$ is maintained in the Application Tables 130 of both the mobile device 214 and remote server 208. Vendors can extend the coverage area to length $CS_{radius}$, but will be penalized as the length of this area grows. This approach provides a more targeted placement of content and services that will increase a mobile user's quality and experience. In some aspects, a mobile device 214 has the ability to sense its location $M_{Loc}(M_{Long}, M_{Lat})$ using the approaches described elsewhere herein.

In some other aspects, location relevance can be calculated on both the mobile device 214, and remote server 208 for contextual targeting, and smart caching. Since mobile devices move between different geographical and spatial locations based on user movement, as users move toward some location of interest, the more relevant the content and services related to the location of interest become to the mobile user. The likelihood of relevance the current location $M_{Loc}(M_{Long}, M_{Lat})$ is to content/services quality is calculated using the following function:

$$Quality_{location}(L) = \begin{cases} 1 & \text{-if } Dist(L, CS_{Loc}) \leq Radius_{default} \\ e^{\frac{-Dist(L,CS_{Loc})}{((CS_{Radius} - Radius_{default})/2)+1}} & \text{-if } Dist(L, CS_{Loc}) > Radius_{default} \cap \\ & Dist(L, CS_{Loc}) \leq CS_{Radius} \\ 0 & \text{-if } Dist(L, CS_{Loc}) > CS_{Radius} \end{cases}$$

The Location Context or location relevance is calculated as:

$$Location_{score}(M_{Loc}) = Quality_{location}(M_{Loc})$$

In still other aspects, to create the UserActivity context, Vendor users publish content (e.g., text audio, video, advertisements, and documents) and services (or, in other examples, Uniform Resource Locators (URLs) to webservices) and provide one or more keywords ($CSContext_{userActivity}$) associated with it. Vendors chose keywords from a predefined set, or vendors can type in keywords of their choosing. All contextual keywords are stored in the Context Tables 132. In some aspects, a mobile device 214 has the ability to sense a mobile user's application context $M_{userActivity}$ using the method described elsewhere herein.

In some aspects, user activity relevance can be calculated on both the mobile device 214, and remote server 208 for contextual targeting, and smart caching. User activity information may be treated as key/value pairs. For example, content and services targeted toward Japanese self serve takeout, would have the following key/value pair; {"Food: Japanese", "ResturantType: Takeout", "Service: Self"}. The calculation can be reduced to a simple intersection of sets problem. A determination is made of the number of terms in the mobile user's activity context that equal to the terms associated with the content and services context divided by the total number of terms. The likelihood of relevance a mobile users application context ($M_{userActivity}$) is to the content/services user activity context ($CSContext_{userActivity}$) is calculated using the following function:

$$Context_{score}(M_{userActivity}) = \frac{|CSContext_{userActivity} \cap (M_{userActivity})|}{|CSContext_{userActivity} \cup (M_{userActivity})|}$$

In still other aspects, to create the Demographics context, Vendor users publish content (e.g., text audio, video, advertisements, and documents) and services (or, in other examples, Uniform Resource Locators (URLs) to webservices) and provide one or more targeted demographics ($CSTarget_{demo}$) associated with it. Vendors chose demographics from a predefined set, and all demographics are stored in the Context Tables 132. In some other aspects, a mobile device 214 has the ability to sense a mobile user's demographics context $M_{demo}$ using the approaches described elsewhere herein.

In some aspects, user demographic relevance can be calculated on both the mobile device 214, and remote server 208 for contextual targeting, and smart caching. Demographic information as key/value pairs, may be treated in similar way to the user application context described elsewhere herein. Keys represent the demographic categories (e.g., Gender, Income, Age, Occupation, and others). For example, content and services targeted toward a demographic of males, with income of $25K, with an age 25, would have the following key/value pairs: "Gender:M", "Income:19K-49K", "Age:18-29". The calculation can be reduced to a simple intersection of sets problem. A determination is made of the number of demographics in the mobile user's demographic context that equal to the demographics associated with the content and services context divided by the total number of demographic categories. The likelihood of relevance a mobile users application context ($M_{demo}$) is to the content/services demographics context ($Demographics_{score}$) is calculated using the following function:

$$Demographics_{score}(M_{demo}) = \frac{|CSTarget_{demo} \cap M_{demo}|}{|CSTarget_{demo} \cup M_{demo}|}$$

In some other aspects, the Context Manager 128 maintains the local context for a mobile device through a timer interval TI, a timer event, and an event handler. The Context Manager 128 contains three methods that manipulate the timer: 1) setTimer( ), 2) enableTimer( ), and 3) disableTimer( ). Once the timer TI expires, a timer event is fired, triggering the getLocalContext( ) event handler to be invoked within its own thread. The value of TI must be chosen carefully, as the sample rate could impact the battery performance of a limited resourced mobile device. The getLocalContext( ) event handler queries all the available sensors (i.e. GPS, Clock, Accelerometer, and Compass) and stores the results within one of the Application Tables 130. In some aspects, additional context information is explicitly obtained from user activities within the application by invoking methods on the Context Manager 128. The Context Manager 128 contains the following methods that store key/value pairs within one of the Application Tables 130 to explicitly capture user context:

a) string <key> setContext(string <value>)
b) [string <key>] setContext(string <text>, double <threshold>)
c) void removeContext(string <key>)
d) void removeAll( )

Approach a) appends the current value to the user context vector, and returns its key as an identifier for future reference. Approach b) takes a string of text and calculates the term frequency for all terms minus the stop words in the text, and appends a list of the current values to the user context vector and returns a list of keys of all terms whose frequency is greater than or equal to the specified threshold. Approach c) removes a key/value pair from the user context vector based on the given key. Approach d) removes all key/value pairs from the user context vector. For an example of its use, as a user navigates through a menu list, and one or more sub-list, every item selected will cause an invocation on the setContext (<value>) method; passing the selected item as parameter. In another example, the text of an email, or content page within the application can be passed in as a parameter to the setContext(<text>, <threshold>) method. In some aspects, additional context information is explicitly obtained from user demographics, set by mobile user triggering the invocation of methods on the Context Manager 128. The Context Manager 128 contains the following methods that store key/value pairs for Demographics within one of the Application Tables 130 to explicitly capture user demographics:

a) string <key> setDemographics(enum <type>, string <value>)
  b) void removeDemographics (string <key>)
  c) void removeAll( )

Approach a) appends the current value to the user demographics vector of a specific type, and returns its key as an identifier for future reference. Approach b) removes a key/value pair from the user demographics vector based on the given key. Approach c) removes all key/value pairs from the user demographics vector. For simplicity, we represent the entire local mobile context as a vector:

$$MC=\{Location\{CS_{Loc}(CS_{Long}, CS_{Lat}), Location\_ID\},\\ Time\{Time, Date\}, UserActivity[\ ], Demographics[\ ]\}$$

Where the vector includes the current longitude/latitude and optional Location_ID, the current time and date on the mobile device, a list of key/value pairs representing the user activity context, and a list of key/value pairs representing the user demographic. In some aspects, the Context Manager 128 maintains a cache of the most relevant data based on the dynamically changing context of the mobile device, and the preferred quality of the user experience. The relevance vector (R) is determined by sensing the mobile user's context and calculating the likelihood of relevance (i.e. score values) for: Time, Location, Application Context, and Demographics for all data residing in the local Content Table 134. In particular, the relevance vector for a mobile device M is:

$$R(M)=\{Time_{Score}(M_{Time}), Location_{Score}(M_{Location}),\\ Context_{Score}(M_{UserActivity}), Demographics_{Score}(M_{Demo})\}$$

Each relevance score can be tuned to an individual weighted preference set by a mobile user. In some aspects, a Preference Vector P is maintained by the Context Manager 128 and includes four weighted values for user configuration:

$$P=\{Location_{weight}, Time_{weight}, UserActivity_{weight}, Demographics_{weight}\}$$

The preference vector P is constrained by:

$$Location_{weight}+UserActivity_{weight}+Time_{weight}+Demographics_{weight}=1.$$

Furthermore, a new weighted Relevance vector R' can be computed to intensify each score based on the user preference vector P from a source S as follows:

$$R'(S)=R(S)\times S_P/\|R(S)\|$$

This can be demonstrated for example, if a user prefers to receive content and services by location, then $Location_{weight}=1$, while all other preferences would be set to 0. In another example, if a user prefers to receive content and services equally based on location, time, and demographics, then $Location_{weight}$, $Time_{weight}$, and $Demographics_{weight}$ would all be set to 0.33, while $UserActivity_{weight}=0$.

The dynamic selection of content, data caching, and data replication is based on the local context of a mobile device. In some aspects, all three operations are based on a context-aware query $q=CA_{Similarity}$, (MC, T) formulated by the following three operations:

1) For all records s in the content database on the target machine T:

$$q=T_R(MC)_{Location}+T_R(MC)_{Date}+T_R(MC)_{UserActivity}+\\ T_R(MC)_{Time}+T_R(MC)_{Demographics}\}$$

2) Normalize and rank the q from 0 and 1.

$$r=Rank(q)-1/MAX(q)-1$$

3) Return records s sorted by rank r.

T is the target's content database (i.e. Content Tables 134). The target machine can be: 1) the local mobile device, 2) a peer mobile device, or 3) the remote server). $T_{R'}$ is the weighted relevance vector calculated using the local mobile context and preferences from a source mobile device MC. The resulting similarity ranges from 0 meaning exactly opposite, to 1 meaning exactly the same, and in-between values indicating intermediate similarity or dissimilarity.

In still other aspects, dynamic selection and notification of content and services executed on a mobile device (M), is calculated based on the similarity function $CA_{Similarity}(M, M)$ executed over all records within Content Tables maintained in the database residing on the mobile device M. The results of the query are sorted in descending order. All data with a relevance score greater than the $Relevance_{TOLERANCE}$ (i.e. typically above +0.70) are returned. The $Relevance_{TOLERANCE}$ is stored in the Application Tables 130.

In some aspects, data caching can occur between the mobile device 214 and the remote server 208, and between two peer mobile devices 214. The content and services that are most relevant based on the mobile device context and most recently used in time should be accessible and valid (i.e. up to date) on the local mobile device. The execution of the approaches described herein can be performed on data residing on the local mobile device thereby eliminating the need to perform the operation on a centralized remote server. Since long range wireless access is not necessary, smart caching provides resource constrained mobile devices more efficient resource utilization in terms of power and bandwidth. Smart caching involves the need for dynamic free space management. In some aspects, the smart cache ensures that the data residing in the Content Tables 134, and associate media files maintained by the local file system 142, do not exceed a memory/storage threshold (CT). In some aspects, the Context Manager 146 on mobile devices 214 uses a Least Relevant/Least Recently Used (LR/LRU) eviction policy. Each mobile device 214 contains a pre-set constant (WSet), which denotes the Working Set window size for the maximum allowable time between accesses. WSet and CT are stored within the Application Tables 130. Records on a mobile device M are targeted for eviction using the similarity function $CA_{Similarity}$ (M, M) executed over all records within the Content Tables maintained in the database. The resulting record set is further filtered to remove stale (i.e. out of date) records; such that the difference between the mobile Time context and the last access time is greater than the WSet.

In some other aspects, data replication of content and services between a source device S and a target device or server T, is calculated based on the similarity function $CA_{Similarity}(S, T)$ executed over all records within Content Tables maintained in the database residing on the mobile device or server T. The results of the query are sorted in descending order. All data with a relevance score greater than the $Relevance_{TOLERANCE}$ (i.e. typically above +0.70) are returned. The $Relevance_{TOLERANCE}$ is stored in the Application Tables 130. Data replication can occur between the mobile device 214 and the remote server 208, and between two peer mobile devices 214. Data replication between the mobile device 214 and the remote server 208 is only initiated in one direction. Meaning that shared and private updates flow in one direction from the mobile device to the remote server, while content flows from the remote server to the mobile device. Private updates are only replicated to the remote server. Data replication between two mobile peers is initiated in both directions. Meaning that shared updates and content flow in both directions. Therefore, both devices become strongly consistent with respect to their own local contexts, and all other data remain weakly consistent. Since only relevant data is replicated between devices, this form of replication is more efficient in bandwidth and storage usage.

Figure 5:
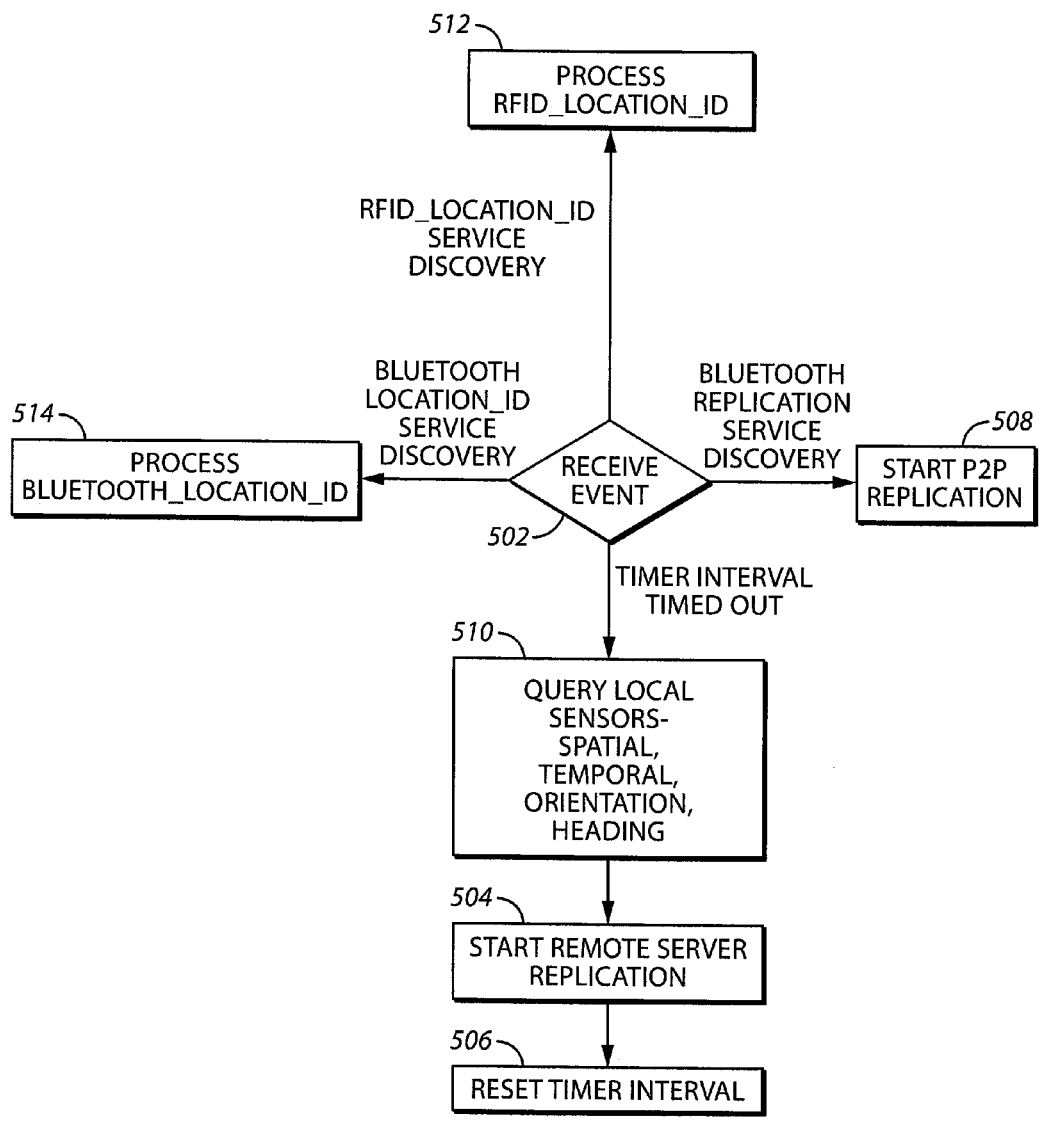
FIG. 5 comprises a high level flow chart of the event based control in accordance with various embodiments of the invention.

FIG. 5 illustrates the high level event-based control process of the Context Manager 146. Initially, the Context Manager is in an idle state waiting for an event. At step 502, the Context Manager receives an asynchronous event. This event may be a Timer Interval Timeout Event, a Bluetooth Replication Service Discovery Event, a Bluetooth Location_ID Service Discovery Event, or a RFID Location_ID Service Discovery Event to mention a few examples. A Timer Interval Timeout Event signals to the mobile device that it is time to update the local context and contact the remote server. The Context Manager, in its own thread, invokes the getLocalContext( ) operation (step 510). The Context Manager directly queries any internal and external sensors (e.g. GPS, Compass, Clock, and Accelerometer). At step 504, the Context Manager invokes the Replication Manager to begin the process of contacting the remote server 208 and begin a data replication session. Upon completion of a data replication session, the Timer Interval is reset (step 506), and the Context Manager event handler thread is terminated. A Bluetooth Replication Service Discovery Event, signals to the mobile device that a peer device is within range. At step 508, the Context Manager invokes the Replication Manager in its own thread to begin the process of communicating with the peer mobile device to begin a data replication session. Upon completion of a data replication session, the Replication Manager event handler thread is terminated. A RFID Location_ID Service Discovery Event, signals to the mobile device that a RFID Location_ID tag is within range and the RFID tag reports a global unique identifier (e.g. GUID). At step 512, the Context Manager in its own thread calculates the true physical location based on the GUID. Upon completion of a data replication session, the Context Manager event handler thread is terminated. A Bluetooth Location_ID Service Discovery Event, signals to the mobile device that a Bluetooth Location_ID tag is within range and the Bluetooth tag reports a global unique identifier (e.g. GUID). At step 512, the Context Manager in its own thread calculates the true physical location based on the GUID. Upon completion of a data replication session, the Context Manager event handler thread is terminated.

Figure 3:
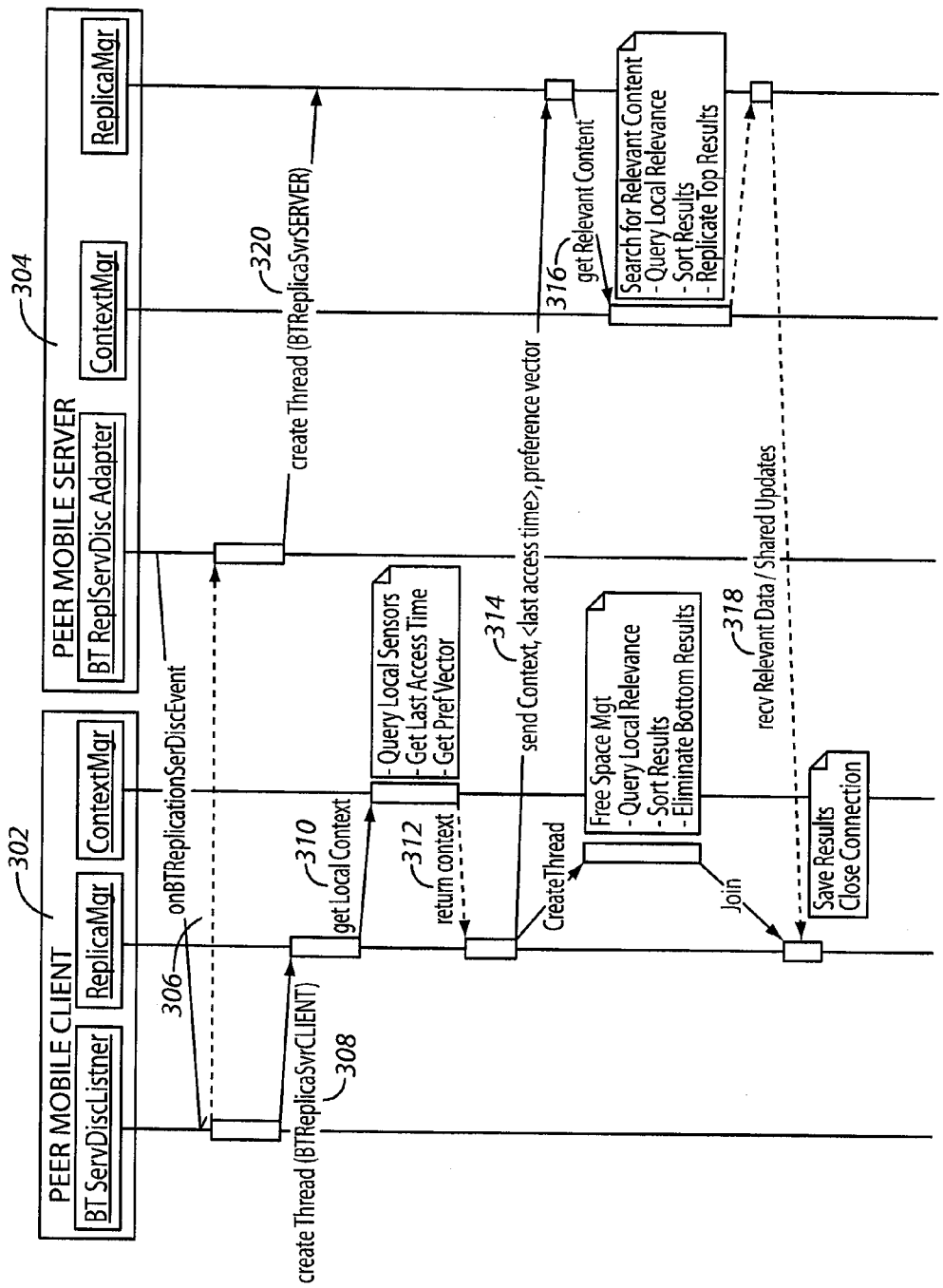
FIG. 3 schematically illustrates peer-to-peer (P2P) data replication and data updates in accordance with various embodiments of the invention.

Data replication and caching between peer mobile devices is more efficient in that it utilizes the Bluetooth low power wireless link technology. Devices utilize a service discovery protocol to identify other devices within range. More generally, FIG. 3 illustrates a sequence diagram for data replication between two peer mobile devices; a client device 302, and a server device 304. At step 306, the client receives a service discovery event that another device with a context-aware replication service is within range. Once both devices form the communication link, each peer creates a thread and begins the data replication process (steps 308 and 320). The client 302 must first sense its local context (step 310 and 312), and transmit its mobile context as a request message (step 314) to the peer mobile server. Once received, the server will search for available content and services that are of interests to the client (step 316), and respond with local content that is most similar to the request (step 318).

Figure 4:
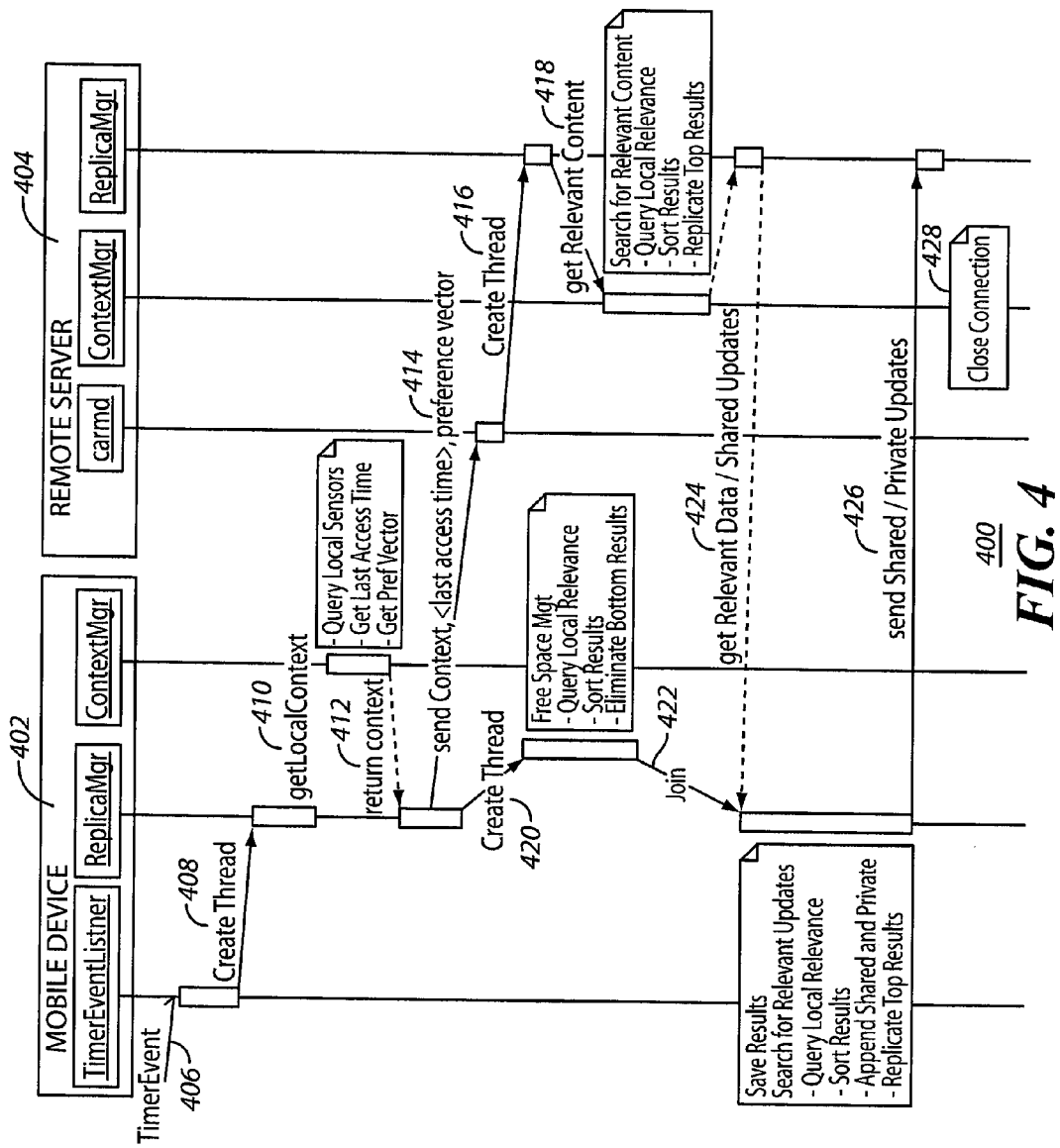
FIG. 4 schematically illustrates data replication and data updates to a remote server in accordance with various embodiments of the invention.

Because of the need to use of high powered wireless technology (e.g., WWAN approaches) to communicate with a remote server, data replication and caching between a mobile device and a remote server is more costly in terms of power and bandwidth. As shown in FIG. 5, connections to remote servers only occur periodically, based on a timer interval. In addition, as some examples of the high level control of the sub-process 508 is designed such that peer-to-peer communication is given priority over remote server communication. This is executed by disabling and enabling the timer interval on the Content Manager 128 (see FIG. 7A and FIG. 7B). More generally, FIG. 4 illustrates a sequence diagram for data replication between a mobile device 402, and a remote server device 404. At step 406, the mobile device receives a timer event that alerts the mobile device 402 to create a thread and begin the data replication process (step 408). The mobile device 402 will sense its local context (step 410 and 412), and transmit its mobile context as a request message (step 414) to the remote server 404. Once received, the remote server 404 will create a worker thread to handle the request (step 416). The worker thread begins to search for available content and services that are of interests to the mobile device (step 418), and respond with local content and services that are most similar to the request (step 424). Upon receipt of all relevant content from the remote server 404, the mobile device 402 transmits its local copy of relevant shared and private updates to the remote server 404 to maintain a master copy of any updates (e.g., personal accounts updates).

Figure 6:
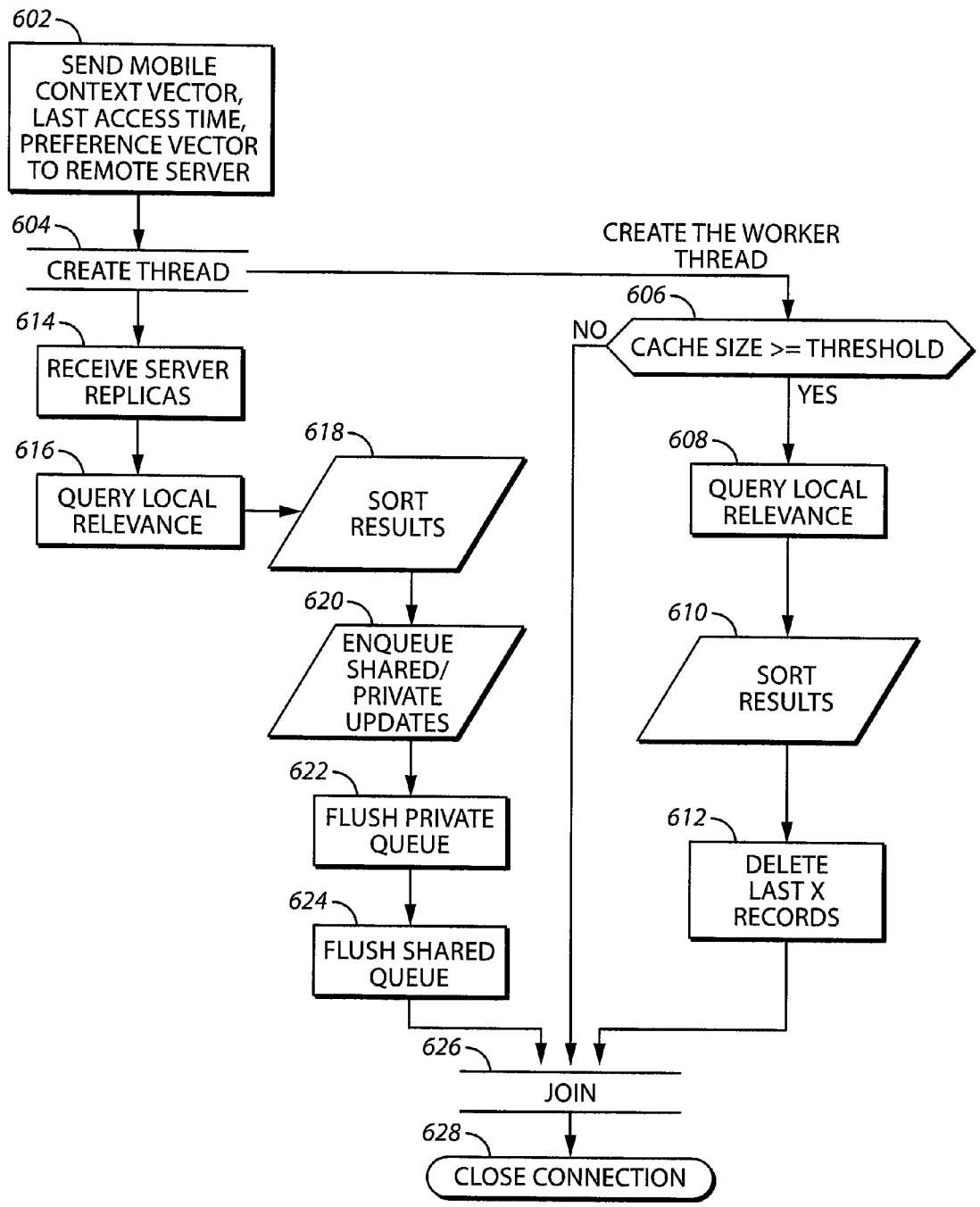
FIG. 6 comprises a flow chart for a mobile device performing weak consistent data replication with a remote server in accordance with various embodiments of the invention.

FIG. 6 illustrates a mobile device sub-process 504 for data replication with a remote server executed by the Replication Manager 146. At step 602, the Replication Manager 146 sends a mobile context message to the remote server 208 based on the format 902 described in FIG. 9. At step 604, the Replication Manager 146 creates a thread to multitask the caching and free space management and replica transmission concurrently. The parent thread handles replica transmission (steps 614-624). The child thread handles caching and free space process management (steps 606-612). At step 614, the remote server 208 returns one or more replicas based on the format 904 described in FIG. 9. After all replicas have been received, the mobile device 214 performs a context-aware query to find all relevant content (step 616) based on the current mobile context. At step 618, the results of the query are sorted in descending order. All data with a relevance score greater than the Relevance$_{TOLERANCE}$ (e.g., typically above +0.70) is inserted into the proper queue (step 620). The Relevance$_{TOLERANCE}$ is stored in the Application Tables 130. Shared data updates are inserted into the Shared Queue Table 136, and private data updates are inserted into the Private Queue Table 138. Steps 622 and 624, transmit data in the private and shared queues until the queues are empty or the connection is lost. All shared and private updates are transmitted using the format 904 described in FIG. 9. All outgoing data remains in the queue until transmitted during the current session, or the next available session. At step 606, the smart cache performs free space management and checks to see if the Content Tables 134 and Local File System 142 exceed the memory/storage threshold (CT). If the threshold has not been exceeded, then the thread is terminated (step 626), else the process of evicting content based on a LR/LRU policy described elsewhere herein is initiated (steps 608-612). At step 608, a context query is executed on the Content Tables 134 to identify the most relevant content. At step 610, the results of the query are sorted in descending order. At step 612, the bottom X results with a relevance score less than the Relevance$_{TOLERANCE}$, and any associated files in the Local File System, are deleted to free up memory and storage. At step 626, both threads are joined, and the connection is closed at step 628.

Figure 7A:
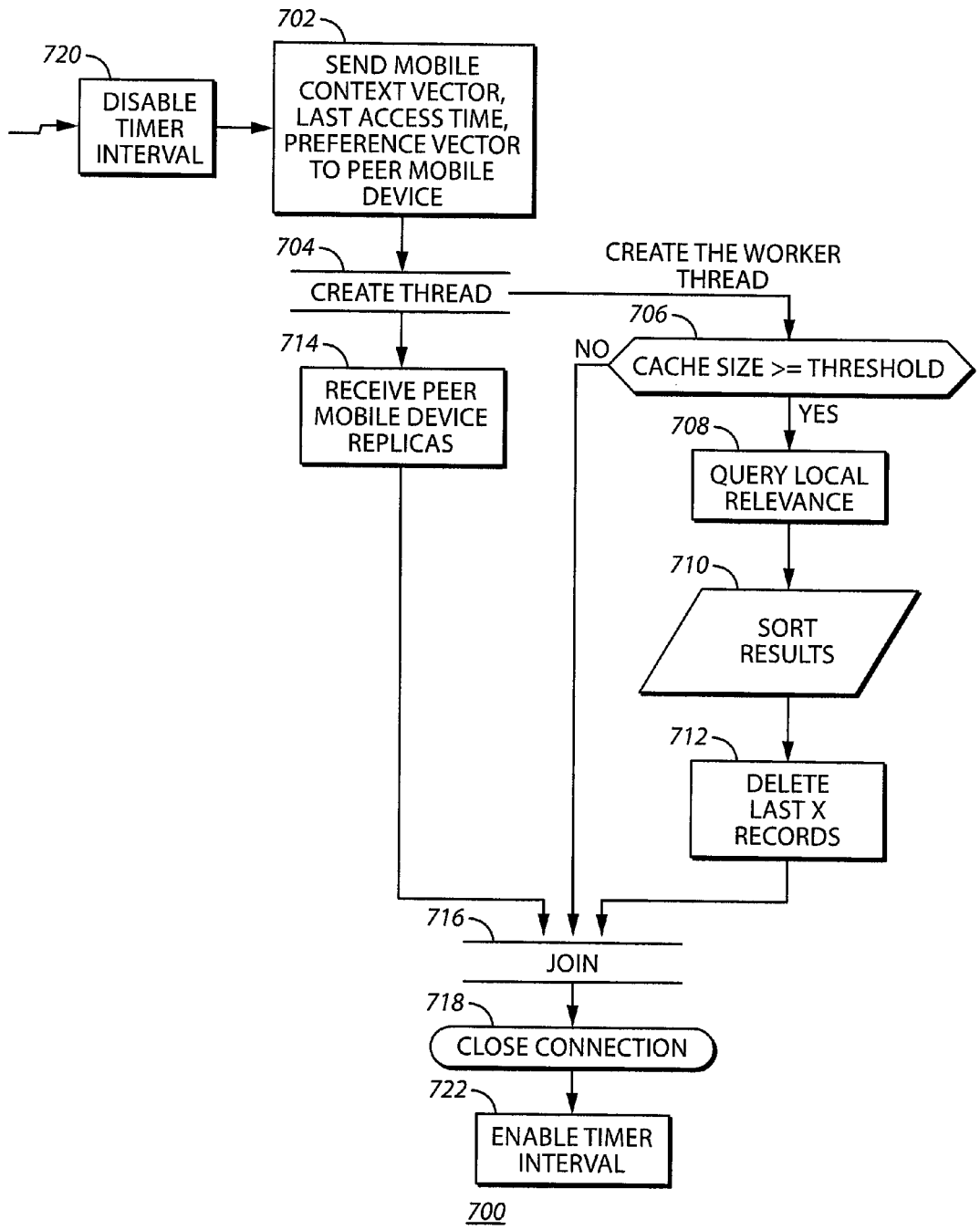
FIG. 7A comprises a flow chart for a mobile client device performing weak consistent P2P data replication with a peer mobile server device in accordance with various embodiments of the invention.

FIG. 7A illustrates the sub-process 508 of a peer mobile client performing data replication with a peer mobile server. Initially, the timer interval is disabled (step 720), so that dual transmission over WWAN and Bluetooth will not occur. This is utilized in order to conserve battery power, as well as, to minimize communication interference. At step 702, the Replication Manager 146 of the client, sends a mobile context message to the peer mobile server device 214 based on the format 902 described in FIG. 9. At step 704, the Replication Manager 146 creates a thread to multitask the caching and free space management and replica transmission concurrently. The parent thread handles replica transmission 714. The child thread handles caching and free space process management (steps 706-712). At step 714, the peer mobile client device 214 receives one or more replicas, sent from the peer mobile server, based on the format 904 described in FIG. 9. At step 706, the smart cache performs free space management and checks to see if the Content Tables 134 and Local File System 142 exceed the memory/storage threshold (CT). If the threshold has not been exceeded, then the thread is terminated (step 716), else the process of evicting content based on a LR/LRU policy described elsewhere herein is initiated (steps 706-712). At step 708, a context query is executed on the Content Tables 134 to identify the most relevant content. At step 710, the results of the query are sorted in descending order. At step 712, the bottom X results with a relevance score less than the $Relevance_{TOLERANCE}$ (i.e. typically above +0.70), and any associated files in the Local File System, are deleted to free up memory and storage. The $Relevance_{TOLERANCE}$ is stored in the Application Tables 130. At step 716, both threads are joined, and the connection is closed at step 718. Lastly, the timer interval is enabled to allow communication with the remote server.

Figure 7B:
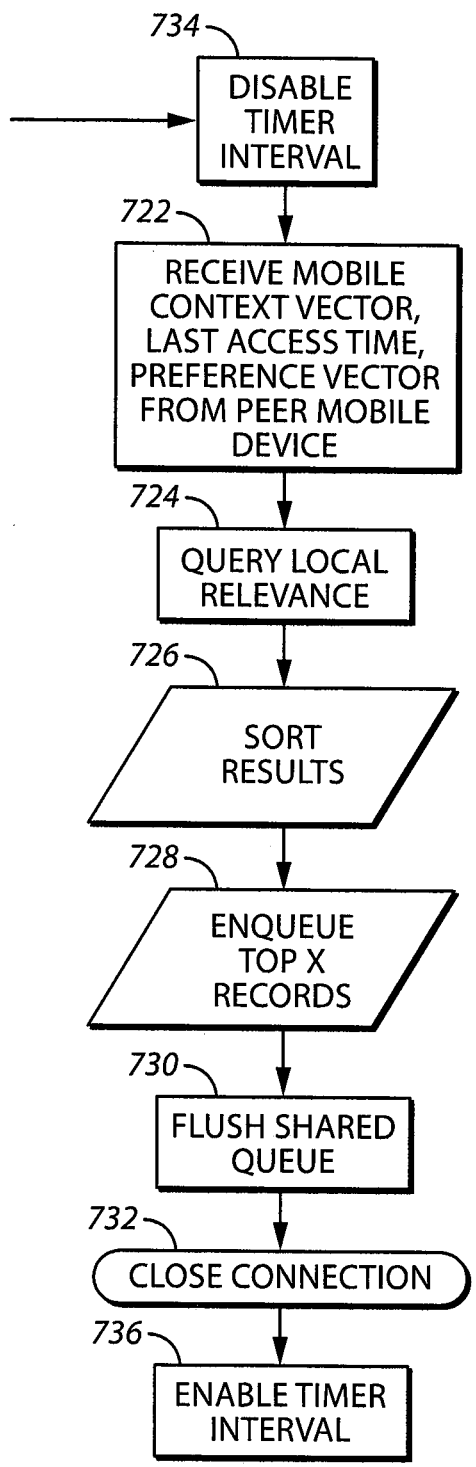
FIG. 7B comprises a flow chart for a mobile server device performing weak consistent P2P data replication with a peer mobile client device in accordance with various embodiments of the invention.

FIG. 7B illustrates the sub-process 508 of a peer mobile server responding to a data replication request from a peer mobile client. Initially, the timer interval is disabled (step 734), so that dual transmission over WWAN and Bluetooth will not occur. This is utilized in order to conserve battery power, as well as, to minimize communication interference. At step 722, the peer mobile server device 214 blocks waiting to receive a mobile context message from the peer mobile client device to begin data replication. At step 724, the mobile device performs a context-aware query to find all relevant content based on the peer mobile client device's current context and preferences. At step 726, the results of the query are sorted in descending order. All data with a relevance score greater than the $Relevance_{TOLERANCE}$ (i.e. typically above +0.70), is inserted into the shared queue (step 728). Shared data updates are inserted into the Shared Queue Table 136. The $Relevance_{TOLERANCE}$ is stored in the Application Tables 130. Step 730 transmits data in the shared queue until the queue is empty or the connection is lost. All shared data updates are transmitted using the format 904 described in FIG. 9. All outgoing data remains in the queue until transmitted during the current session, or during the next available session. The reliability of replica (i.e. shared data) delivery between peers can be increased by increasing the number of transmitted replicas to different peers before removing the replica from the queue. In the event of a disconnection, or when all data is transmitted, then the connection is closed (step 732). Lastly, the timer interval is enabled to allow communication with the remote server.

Figure 8:
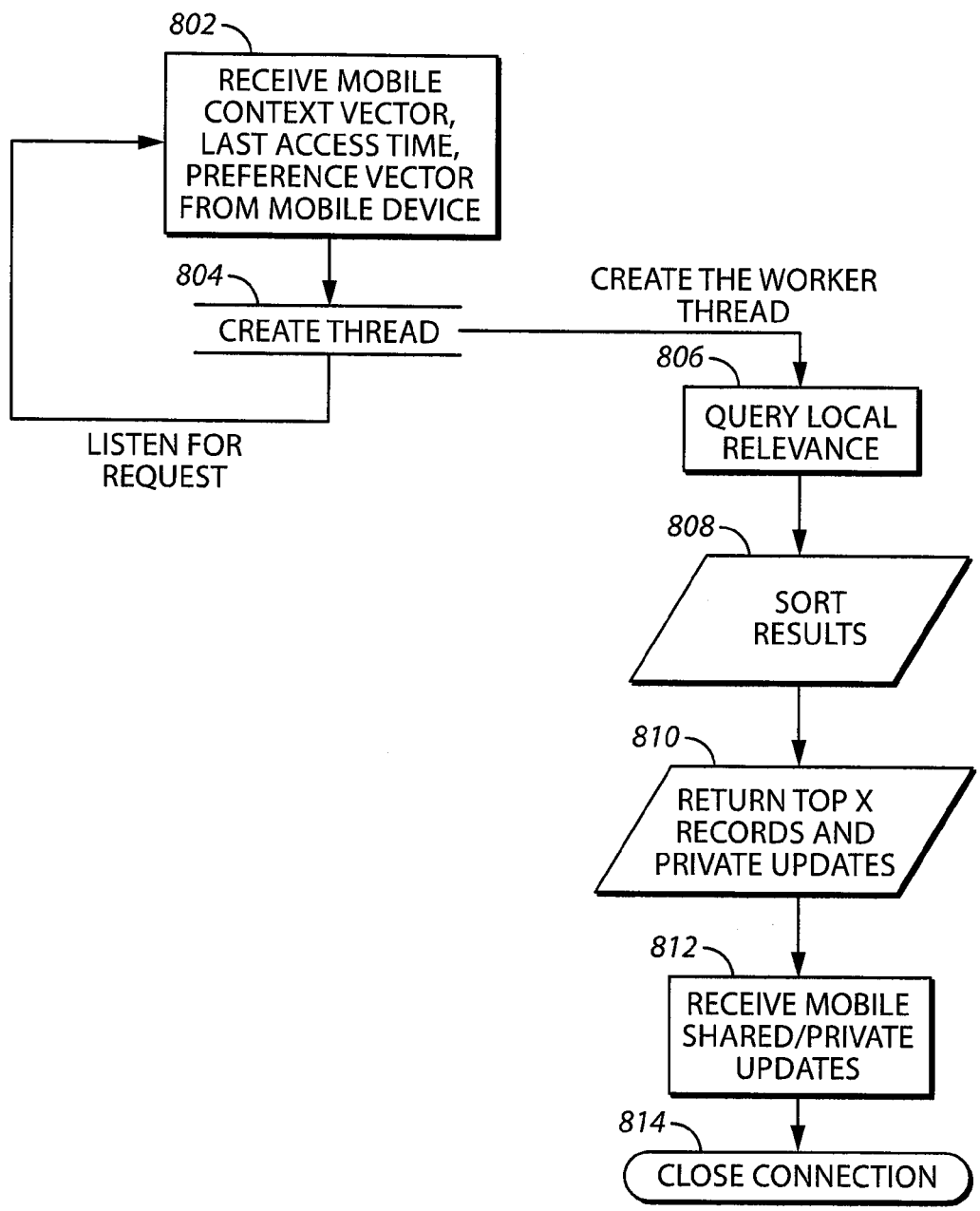
FIG. 8 comprises a flow chart for a remote server performing weak consistent data replication with a mobile device in accordance with various embodiments of the invention.

FIG. 8 illustrates the remote server 208 process for data replication with a mobile device 214. At step 802, the Replication Manager 146 on the remote server 208 blocks waiting to receive a mobile context message from a mobile device 214. At step 804, the Replication Manager 146 creates a child worker thread to begin data replication with a mobile device 214. The parent thread returns back to a block state, waiting to receive additional mobile context messages from one or more mobile devices 214. At step 806, the Replication Manager 146 performs a context-aware query to find all relevant content based on the context of the requesting mobile device. At step 808, the results of the query are sorted in descending order. All results with a relevance score greater than the $Relevance_{TOLERANCE}$ (i.e. typically above +0.70) and any private updates are transmitted to the requesting mobile device until complete, or until the connection is lost (step 810). The $Relevance_{TOLERANCE}$ is stored in the Application Tables 130. Once the connection is lost, the child worker thread and its results are lost. After all replicas have been transmitted, the child worker thread blocks, waiting to receive shared and private updates from the requesting mobile device (step 812). All data are transmitted using the format 904 described in FIG. 9. At step 814, the child worker thread is terminated and the connection is closed.

FIG. 9 defines the message format for sending a mobile context message 902 from a mobile device 214 to a remote server 208, and between two peer mobile devices 214 for processing. Furthermore, 904 defines the message format for sending and receiving replica data (e.g., data content, shared and private updates). These examples do not express the encoding mechanism or control messages.

Figure 10:
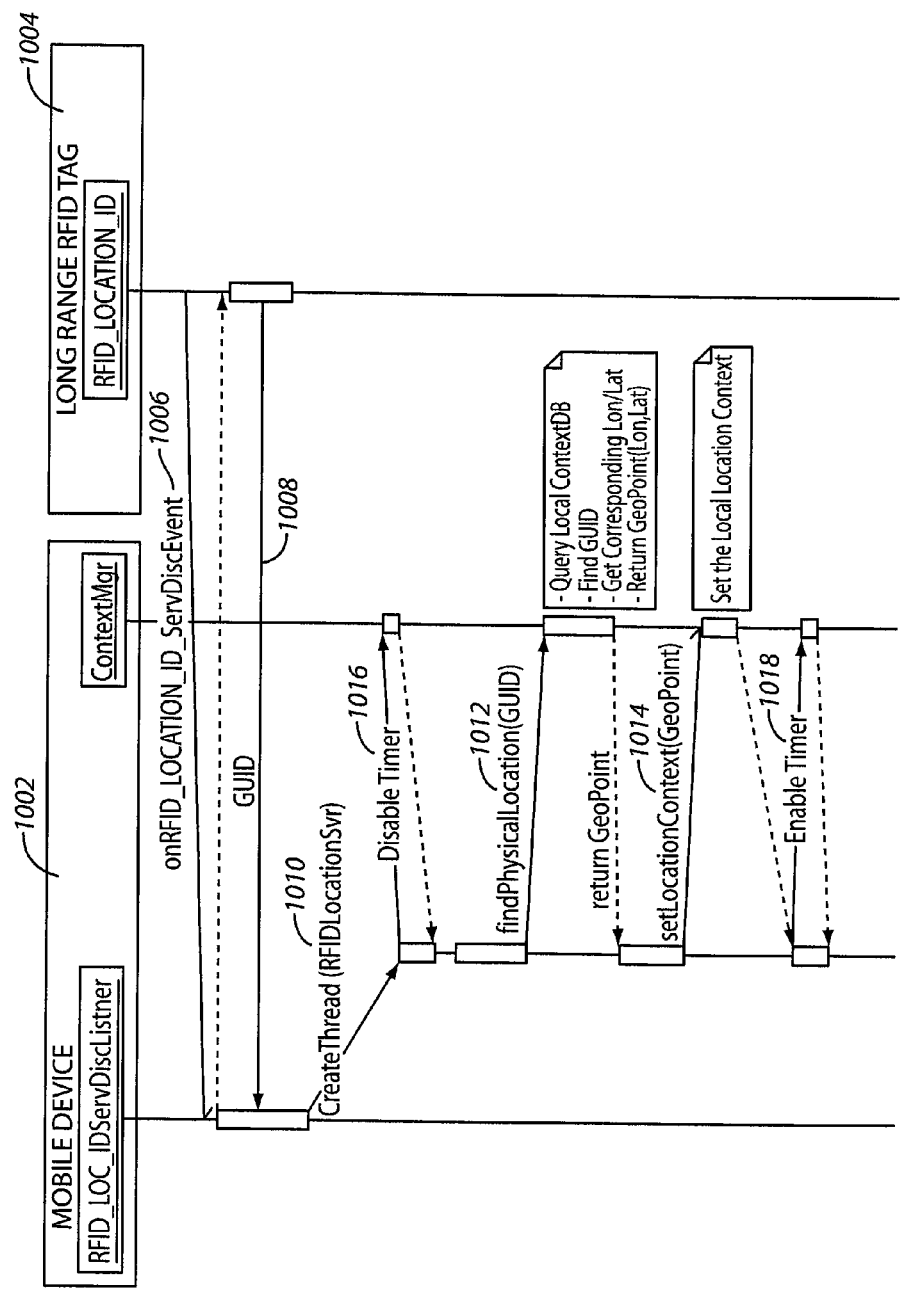
FIG. 10 schematically illustrates the sequence of operations performed by a mobile device when discovering a RFID Location_ID Service in accordance with various embodiments of the invention.

FIG. 10 illustrates a sequence diagram for a mobile device 1002 processing a RFID Location_ID transmitted from a long range RFID tag 1004. At step 1006, the mobile device receives a RFID Location_ID Service Discovery Event along with a GUID from the RFID tag that alerts the mobile device 1002 to create a handler thread to calculate the true physical location. Initially, the handler thread disables the timer interval (step 1016), so that dual transmission over WWAN and RFID will not occur. This is done in order to conserve battery power, as well as, to minimize communication interference. At step 1012, the handler thread invokes the findPhysicalLocation( ) method on the Context Manager 146 to query the Context Tables 132 to find the physical location or GeoPoint (i.e. $CS_{Loc}(CS_{Long}, CS_{Lat})$, for the given GUID. At step 1014, the thread invokes the setLocationContext( ) method on the Context Manager 146 to set the local location context of the device. After completion, the timer interval is enabled, and the thread is terminated (step 1018).

Figure 11:
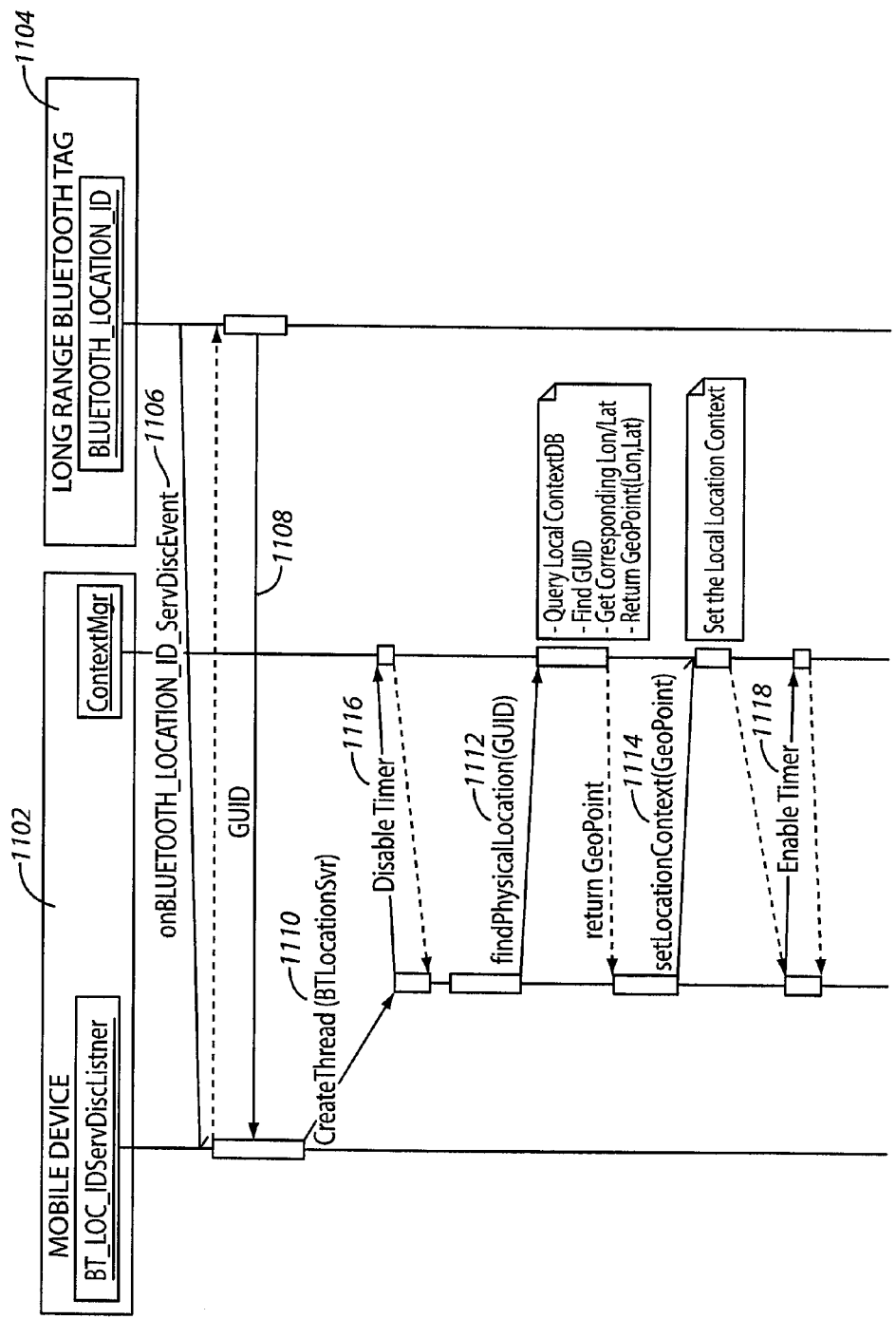
FIG. 11 schematically illustrates the sequence of operations performed by a mobile device when discovering a Bluetooth Location_ID Service in accordance with various embodiments of the invention.

FIG. 11 illustrates a sequence diagram for a mobile device 1102 processing a Bluetooth Location_ID transmitted from a long range Bluetooth tag 1004. At step 1006, the mobile device receives a Bluetooth Location_ID Service Discovery Event along with a GUID from the Bluetooth tag that alerts the mobile device 1002 to create a handler thread to calculate the true physical location. Initially, the handler thread disables the timer interval (step 1116), so that dual transmission over WWAN and Bluetooth will not occur. This is done in order to conserve battery power, as well as, to minimize communication interference. At step 1012, the handler thread invokes the findPhysicalLocation( ) method on the Context Manager 146 to query the Context Tables 132 to find the physical location or GeoPoint (i.e. $CS_{Loc}(CS_{Long}, CS_{Lat})$ for the given GUID (step 1012). At step 1014, the thread invokes the setLocationContext( ) method on the Context Manager 146 to set the local location context of the device. After completion, the timer interval is enabled, and the thread is terminated (step 1118).

While the invention herein disclosed has been described by means of specific embodiments and applications thereof, numerous modifications and variations could be made thereto by those skilled in the art without departing from the scope of the invention.

What is claimed is:

1. A method that efficiently cache and replicate application data in a context-aware system, the method comprising:
at a first mobile device:
determining a context of the first mobile device;
determining a context preference of a user associated with the first mobile device;
transmitting the context of the first mobile device and the user context preference to a server and responsively receiving first content data from the server;
receiving second content data from a second mobile device;
receiving private data updates from a user of the first mobile device and storing the received private updates in a first transmission queue, the private data updates associated with data that is not accessible by the general public;
receiving shared data updates from the user of the first mobile device and storing the received shared data updates in a second transmission queue, the shared data updates associated with data that is accessible by the general public;
determining a relevancy of the first content data and the second content data based upon the context of the first mobile device and storing the first content data and the second content data having a relevancy greater than a predetermined threshold in a third transmission queue;
transmitting contents of the first transmission queue and the second transmission queue to the server;
transmitting the contents of the second transmission queue and the third transmission queue to the second mobile device;
determining available free space in the third transmission queue of the first mobile device;
caching all data in the third transmission queue whose timestamp is within a predetermined threshold, the data being cached in at least a portion of the free space.

2. The method of claim 1 wherein transmitting the context of the mobile device and the user context preference to a server comprises transmitting to the server periodically.

3. The method of claim 1 wherein determining a context of the first mobile device comprises determining at least one of an event associated with the first mobile device, a time associated with the first mobile device, a location associated with the first mobile device, the pitch/yaw associated with the first mobile device, and a heading associated with the first mobile device.

4. The method of claim 1 wherein determining a context of the first mobile device comprises determining at least one of a demographic associated with the user, or user activity within the application associated with the user.

5. The method of claim 1 wherein determining a user's context preferences comprises setting the temporal, spatial, demographical, and user activity for interfacing and accessing mobile content.

6. The method of claim 1 further comprising accessing content and services via a menu driven user interface and obtaining implicit access to content and services via asynchronous notifications.

7. The method of claim 6 wherein the asynchronous notifications are selected from the group consisting of: a dynamically generated list of advertisements, SMS text messages, emails, and a dynamically generated list of content and services.

8. The method of claim 1 wherein determining available free space comprises calculating a relevance score for all local data in the context-aware system.

9. A mobile device that efficiently caches and replicates application data in a context-aware system, the mobile device comprising:
an interface having an input and output;
a memory including a first transmission queue, a second transmission queue, and a third transmission queue;
a controller coupled to the memory and the interface, the controller configured to determine a context of the mobile device, determine a context preference of a user associated with the mobile device, and transmit the context of the mobile device and the user context preference to a server at the output, the controller also configured to responsively receive first content data from the server via the input, and to receive second content data from the second mobile device via the input;
the controller configured to receive private data updates from a user of the mobile device via the interface and store the received private updates in a first transmission queue, the private data updates associated with data that is not accessible by the general public;
the controller configured to receive shared data updates from the user of the mobile device and store the received shared data updates in a second transmission queue, the shared data updates associated with data that is accessible by the general public;
the controller configured to determine a relevancy of the first content data and the second content data based upon the context of the mobile device and store the first content data and the second content data having a relevancy greater than a predetermined threshold in a third transmission queue;
the controller configured to transmit contents of the first transmission queue and the second transmission queue to the server;
the controller configured to transmit the contents of the second transmission queue and the third transmission queue to the second mobile device;
the controller configured to determine available free space in the third transmission queue of the memory of the mobile device, and cache all data in the third transmission queue whose timestamp is within a predetermined threshold, the data being cached in at least a portion of the free space of the memory.

10. The mobile device of claim 9 wherein the controller is configured to determine at least one of an event associated with the mobile device, a time associated with the mobile device, a location associated with the mobile device, the pitch/yaw associated with the mobile device, and a heading associated with the mobile device.

11. The mobile device of claim 9 wherein the controller is configured to determine at least one of a demographic associated with the user, or user activity within the application associated with the user.

12. The mobile device of claim 9 wherein the controller is configured to set the temporal, spatial, demographical, and user activity for interfacing and accessing mobile content.

13. The mobile device of claim 9 wherein the controller is configured to access content and services via a menu driven user interface at the interface and obtain implicit access to content and services via asynchronous notifications.

14. The mobile device of claim 13 wherein the asynchronous notifications are selected from the group consisting of: a dynamically generated list of advertisements, SMS text messages, emails, and a dynamically generated list of content and services.

15. The mobile device of claim 9 wherein the controller is configured to calculate a relevance score for all local data in the context aware system.

* * * * *